United States Patent [19]
Tsunoda et al.

[11] 3,843,239
[45] Oct. 22, 1974

[54] PHASE SHIFTING PLATE HAVING UNIFORM TRANSMITTANCE

[75] Inventors: Yoshito Tsunoda; Yoshinori Miyamura, both of Tokyo, Japan

[73] Assignee: Hitachi, Ltd., Tokyo, Japan

[22] Filed: May 15, 1973

[21] Appl. No.: 360,421

[30] Foreign Application Priority Data
May 15, 1972 Japan.............................. 47-47185

[52] U.S. Cl.................... 350/314, 161/3.5, 350/3.5, 350/164
[51] Int. Cl. ............................................. G02b 5/28
[58] Field of Search......... 350/3.5, 314, 164, 162 R, 350/162 SF; 117/33.3; 161/3.5

[56] References Cited
UNITED STATES PATENTS
3,604,778  9/1971  Burckhardt.......................... 350/3.5
3,736,047  5/1973  Gelber et al......................... 350/164
3,744,871  7/1973  Takeda et al......................... 350/3.5

OTHER PUBLICATIONS
Born et al., Principles of Optics, Revised Second Edition, The Macmillan Co., New York, 1964, pp. 61–63.

*Primary Examiner*—Ronald J. Stern
*Attorney, Agent, or Firm*—Craig & Antonelli

[57] ABSTRACT

An optical phase shifting plate, for use with a holographic apparatus, comprises a transparent base, a first thin transparent film of a uniform thickness formed thereupon, and a second thin transparent film formed upon the first thin film for effecting two-dimensionally non-uniform phase shifting, the thickness of the first and second thin films being so determined that a uniform distribution of intensity of transmitted light may be obtained.

5 Claims, 8 Drawing Figures

PHASE SHIFTING PLATE HAVING UNIFORM TRANSMITTANCE

BACKGROUND OF THE INVENTION

The present invention relates generally to a holographic apparatus and more particularly an optical phase shifting plate and method for manufacture thereof for forming holograms, recording analog pattern information such as aligned aperture hole information, patterns, configurations, characters, etc.

DESCRIPTION OF THE PRIOR ART

In holography, for a better quality hologram the reconstructed image must contain less noise, the diffraction efficiency must be high and any deviation of information must be minimized.

One of the most widely used holographic methods for recording information is holography of a Fourier transform effected through a lens.

As shown in FIG. 1 coherent light 2, such as from a laser beam, passing through a lens 1, is focused upon a photosensitive recording medium 4 through an information bearing element 3 and interferes with a reference light beam 5 focused upon the recording medium 4 from another light source, so that information is recorded upon the recording medium 4 in the form of an interference pattern 6.

The most important problem encountered in holography of the type described above is the intensity distribution of the light over the photosensitive recording medium 4. As shown in FIG. 2, the intensity of the light decreases as the distance from the optical axis increases, thus leading to a deterioration of the focused image. To overcome this problem, there has been used a defocusing method in which the recording medium 4 is displaced from a focal plane of the lens 1. However, this method has the disadvantage that the radius of the hologram is increased, thus resulting in a significant decrease in the density of the recorded information.

In holography of Fourier transforms which has been employed in order to solve the above problem, a phase shifting plate 7 having a one or two-dimensionally non-uniform pattern is placed in close contact with the information bearing element 3, so that the phase of the transmitted light may be varied at random, as shown in FIG. 3. Examples of the phase shifting plate 7 are shown in cross-sectional views in FIGS. 4a and 4b. The phase shifting plate 7 of the type shown in FIG. 4a is formed by vacuum deposition through a mask, with desired two-dimensional patterns transparent substances 9, upon a base 8. Alternatively, a transparent thin film formed upon the base 8 may be etched by any conventional method through a mask. The phase shifting plate 7 of the type shown in FIG. 4b is made by depositing substances 11 by vacuum deposition through a mask spaced apart by a very close distance from a base 10 in such a manner that the deposition upon the lower surface of the base 10 may be prevented. As clearly shown in FIG. 4b, the deposited portion 11 has a flat top portion 11' and inclined sides 11''. By use of the phase shifting plates 7 of the types described above, the undesired concentration of light upon the photosensitive recording medium 4 may be avoided and the phase of light transmitted through information bearing elements 3 may be varied at random. As a result, the concentration of light upon the recording medium 4 may be also avoided, so that the quality of the hologram may be remarkably improved as compared with a hologram formed by a method not employing a phase shifting plate.

However, holography of the type utilizing a phase shifting plate described above has a distinct disadvantage as will be described hereinafter with reference to FIGS. 4a and 4b. The discrete thin films 9 or 11 are directly formed upon the base 8 or 10 so that the light transmitted through the thin film portion has a reflection loss due to multiple reflections therein and is different in intensity with respect to the light transmitted through the portion not coated with the thin film. As a result, the two-dimensional thin film patterns upon the phase shifting plate is reproduced in the form of a difference in light intensity in the reconstructed image, whereby the quality of the reconstructed image is deteriorated. This phenomenon is especially pronounced when a hologram including many low frequency components is reconstructed.

SUMMARY OF THE INVENTION

One of the objects of the present invention is, therefore, to provide an optical phase shifting plate through which the intensity of light transmitted therethrough may be uniformly distributed.

Another object of the present invention is to provide an optical phase shifting plate for use in a holographic apparatus through which the transmitted light may have random phases and the intensity of the transmitted light may be uniformly distributed.

Briefly stated, an optical phase shifting plate in accordance with the present invention is characterized by a base, a first thin transparent film formed upon the base with a uniform thickness, and a second thin transparent film with desired patterns formed upon the first thin transparent thin film. The multiple reflection losses at various points over the phase shifting plate may be substantially equalized so that the intensity of transmitted light may be uniformly distributed.

The above and other objects, features and advantages of the present invention will become more apparent from the following description of one preferred embodiment therof taken in conjunction with the accompanying drawing.

DESCRIPTION OF THE PREFERRED EMBODIMENTS

Figure 5:
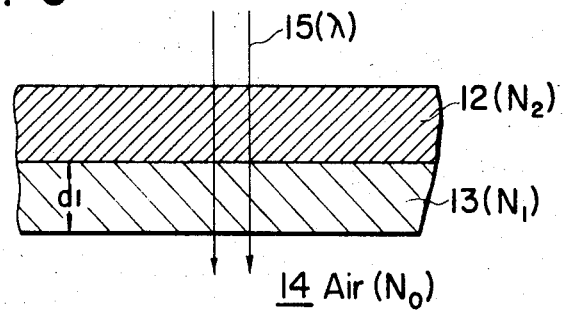
FIG. 5 is a fragmentary sectional view on an enlarged scale of a phase shifting plate comprising a transparent base and a thin film deposited thereupon by vacuum deposition and used for explaining multiple reflection.

First, referring to FIG. 5, the underlying principle of the present invention will be explained. A first thin film 12 having an index of refraction $n_2$ is provided; a second thin film 13 with a thickness $d_1$ has an index of refraction $n_1$ adjacent film 12 and an air layer 14 having an index of refraction $n_o$ is adjacent film 13. When laser beam 15 of a wavelength $\lambda$, is incident at a right angle to the first thin film 12, the multiple reflection loss is given by $$|R|^2 = 1 - \frac{4n_o n_1^2 n_2}{n_1^2(n_2+n_o)^2 - (n_1^2-n_2^2)(n_o^2-n_1^2)\sin^2\frac{\delta_1}{2}}$$

where $$\sigma_1 = 4 n_1 d_1 / \lambda$$

Figure 6:
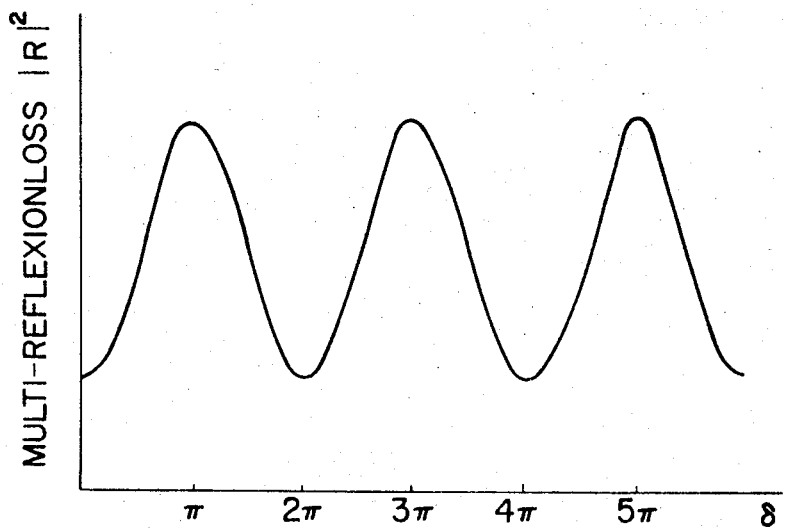
FIG. 6 is a view used for explanation of the relation between the multiple reflection loss and the thickness of a thin film formed by vacuum deposition.

When the wavelength and the indices of refraction remain constant, the relation between $\sigma$ and $|R|^2$ becomes as shown in FIG. 6. From FIG. 6 it is seen that a plurality of values of $\sigma$ are obtained for a given multiple reflection loss $R^2$ so that the multiple reflection loss may be made constant even though the thickness of the thin film is different. Therefore, when a thin transparent film with a uniform thickness is deposited upon a base and another thin film with desired patterns is deposited upon the first thin film, the multiple reflection losses at all of the points over the phase shifting plate may be made equal.

Figure 7:
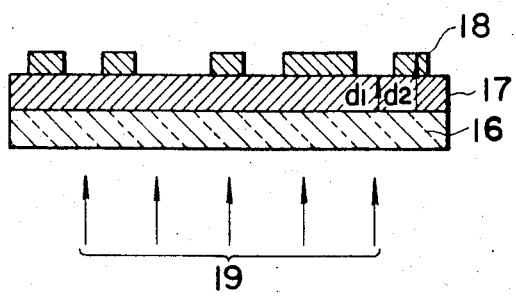
FIG. 7 is a sectional view of a phase shifting plate in accordance with the present invention.

In the phase shifting plate in accordance with the present invention shown in FIG. 7, a transparent base 16 has an index of refraction $n_2$; a first thin transparent film 17 has an index of refraction $n_1$ and a uniform thickness of $d_1$; a second thin transparent film 18 with a desired pattern has an index of refraction $n_3$ and a thickness $d_3$; and an air layer has an index of refraction $n_o$. In the instant embodiment, the thickness $d_3$ of the second thin film 17 is determined in accordance with the following equation, so that the phase difference between the light beam passing through the thin films 17 and 18, and that which passes through only the thin film 17, may be $\pi$ radians, i.e., a half wavelength, where $\lambda$ is the wavelength of the light beam 19 incident upon the phase shifting plate:

$$d_3 = \lambda / 2(n_3 - 1)$$

When the first and second thin films 17 and 18 have the same index of refraction, that is, $n_3 = n_1$, the multiple reflection loss in a thin film with a thickness of $d_2 = d_1 + d_3$ is given from Equation (1):

$$|R_2|^2 = 1 - \frac{4n_o n_1^2 n_2}{n_1^2(n_2+n_o)^2 - (n_1^2-n_2^2)(n_o^2-n_1^2)\sin^2\frac{\delta_2}{2}}$$

(2)

where $\delta_2 = \frac{4\pi n_1 d_2}{\lambda}$

In like manner, in the thin film 17 with a thickness $d_1$, the multiple reflection loss is given by:

$$|R_1|^2 = 1 - \frac{4n_o n_1^2 n_2}{n_1^2(n_2+n_o)^2 - (n_1^2-n_2^2)(n_o^2-n_1^2)\sin^2\frac{\delta_1}{2}}$$

(3)

where $\delta_1 = \frac{4\pi n_1 d_1}{\lambda}$

In order that the multiple reflection loss $|R_1|^2$ may equal to $|R_2|^2$ the following relations must be satisfied:

$$\sin^2(\sigma_1/2) = \sin^2(\sigma_2/2), \text{ and}$$

(4)

$$\sigma_2 = 4\pi n_1 d_2 / \lambda = 4\pi n_1 / \lambda (d_1 + d_3) = \sigma_1 + 2\pi n_1/n_1 - 1$$

(5)

Substituting $d_2 = d_1 + d_3$ and $d_3 = \lambda/2 (n_1 - 1)$ into Equation (5) which, in turn, is substituted into Equation (4), we have $$\sin^2 \sigma_1/2 = \sin^2(\sigma_1/2 + \pi n_1/n_1 - 1)$$

(6)

By rewriting Equation (6), we have $$\{\sin \sigma_1/2 - \sin(\sigma_1/2 + \pi n_1/n_1 - 1)\}\{\sin \sigma_1/2 + \sin(\sigma_1/2 + \pi n_1/n_1 - 1)\} = 0$$

(7)

From equation (7)

$$\sin \sigma_1/2 - \sin(\sigma_1/2 + \pi n_1/n_1 - 1) = 0$$

(7-1)

$$\sin \sigma_1/2 + \sin(\sigma_1/2 + \pi n_1/n_1 - 1) = 0$$

(7-2)

Now by the general addition formulas:

$$\sin A - \sin B = \cos 1/2 (A + B) \sin 1/2 (A - B)$$

and $$\sin A + \sin B = \sin 1/2 (A + B) \cos 1/2 (A - B),$$

equations (7-1) and (7-2) are rewritten respectively as follows:

$$2 \sin 1/2 (-\pi n_1/n_1 - 1) \cos 1/2 (\sigma_1 + \pi n_1/n_1 - 1) = 0$$

(7-3)

$$2 \sin 1/2 (\sigma_1 + \pi n_1/n_1 - 1) \cos 1/2 (-\pi n_1/n_1 - 1) = 0$$

(7-4)

where $\pi n_1/n_1 - 1$ is not always $\pi/2 \cdot m'$, and $m'$ is integer.

Thus, in order to satisfy equation (7)

$$\cos 1/2 \ (\sigma_1 + \pi n_1/n_1 - 1) = 0 \text{ that is, } 1/2 \ (\sigma_1 + \pi n_1/n_1 - 1) =$$
$$\pi(p + 1/2)$$
$$p = 0,1,2,...$$
(7-5)

and $$\sin 1/2 \ (\sigma_1 + \pi n_1/n_1 - 1) = 0, \text{ that is, } 1/2 \ (\sigma_1 + \pi n_1/n_1 - 1) = \pi q$$
$$q = 0,1,2,......$$
(7-6)

since $\sigma_1 = 4\pi n_1 d_1/\lambda$, equations (7-5) and (7-6) are rewritten as:

$$4\pi n_1 d_1/\lambda + \pi n_1/n_1 - 1 = 2\pi \ (p + 1/2) = \pi(2p + 1)$$
(7-7)

$$4\pi n_1 d_1/\lambda + \pi n_1/n_1 - 1 = 2 \pi q$$
(7-8)

Therefore, equations (7-7) and (7-8) are rewritten commonly $$4 \pi n_1 d_1/\lambda + \pi n_1/n_1 - 1 = m \cdot \pi$$
(7-9)

where $m$ includes $(2p + 1)$ and $2q$. From equation (7-9), one derives equation:

$$d_1 = \lambda/4 \ n_1 \ (m - n_1/n_1 - 1)$$
(7-10)

Since $d_1$ is the thickness of layer, and therefore, $d_1 > 0$, the integer $m$ must be chosen so that $m - n_1/n_1 - 1$ is positive.

Hence, the condition for making $|R_1|^2$ equal to $|R_2|^2$ is $$d_1 = \lambda/4n_1 \ (m - n_1/n_1 - 1) \ m = 1,2,.........$$
(8)

It therefore follows that when a thin film with a uniform thickness $d_1$ is formed upon the whole surface of a base and then a second thin film with desired patterns is deposited to a thickness $d^1$, the multiple reflection loss at every point upon the phase shifting plate may be made equal.

Figure 1:
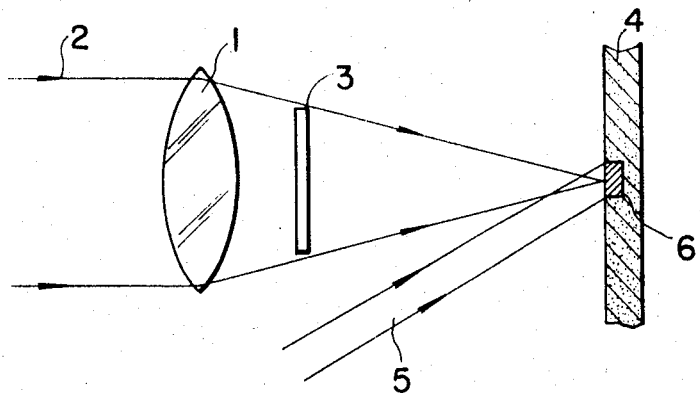
FIG. 1 is a schematic view used for an explanation of a Fourier transform hologram.
Figure 2:
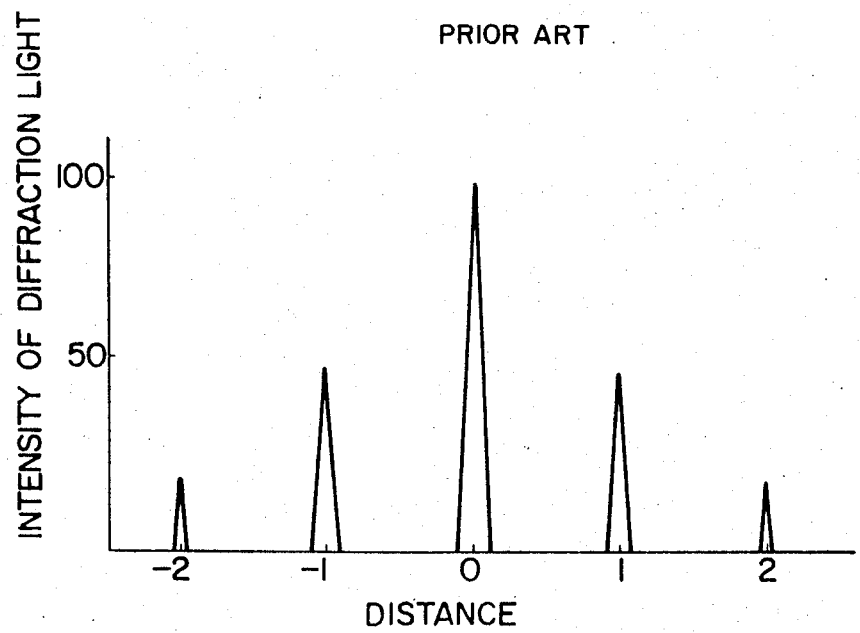
FIG. 2 is a graph illustrating the intensity distribution of light upon a photosensitive recording medium in a conventional process for forming a Fourier transform hologram.
Figure 3:
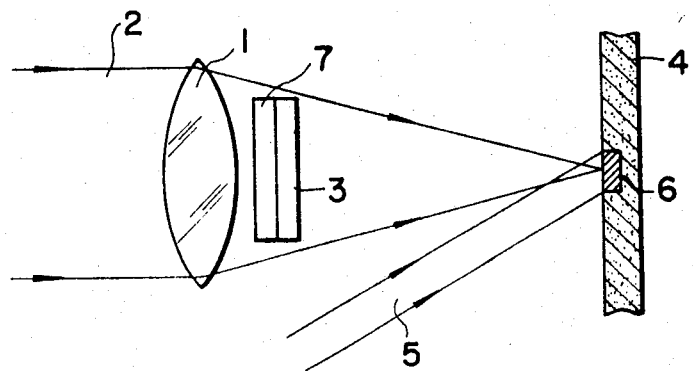
FIG. 3 is a view used for the explanation of a Fourier transform hologram utilizing a phase shifting plate.
Figure 4A:
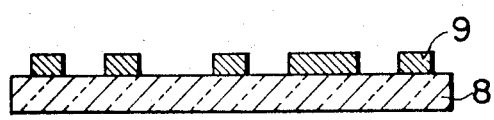
FIGS. 4a and 4b are sectional views of prior art phase shifting plates.
Figure 4B:
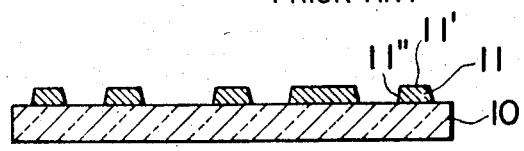

When the phase shifting plate 7 of the type shown in FIG. 4b is used, the multiple reflection loss of light transmitted through the inclined side surface 11″ will not equal that of light transmitted through other portions because the thickness of the inclined side surface 11″ is continuously varied, but as the area of the flat portions 11′ is substantially greater than that of the inclined side surfaces 11″ the intensity of light transmitted through the phase shifting plate may be substantially made uniform.

It is preferable to select the value of m substantially equal to the thickness d in order to facilitate the vacuum deposition process. For the optimum value of m is five when zinc sulfide ZnS with an index of refraction $n_1 = 2.3$ is deposited or seven when cerium fluoride CeF with an index of refraction $n_1 = 1.67$ is used.

According to the present invention, a first thin transparent film is first deposited upon a transparent base and then a second thin transparent film with a desired pattern is formed through a mask upon the first thin transparent film as shown in FIG. 4a or 4b.

As described hereinbefore, the multiple reflection loss at every point of a phase shifting plate may be made equal by selecting the thickness of first and second thin films coated upon a transparent base, so that the intensity of light transmitted through the phase shifting plate may be uniformly distributed. As a result, the change in intensity of light of a reconstructed image may be eliminated so that the quality of a reconstructed image may be improved. The phase shifting plate in accordance with the present invention is advantageous, especially when it is used in a holographic apparatus for recording analog information. Furthermore, the phase shifting plate, in accordance with the present invention, is used to eliminate speckle noise of laser light due to its coherency. That is, when a conventional phase shifting plate with irregular patterns is made into contact a transparent twodimensional information bearing member, the intensity of light transmitted therethrough is not uniformly distributed. The phase shifting plate in accordance with the present invention may also overcome this problem.

The present invention is not limited to a phase shifting plate with irregular patterns used with a holographic apparatus, and it is to be understood that a phase shifting plate in accordance with the present invention may be used with various optical apparatus and equipment when a uniform distribution of intensity of transmitted light is desired.

We claim:

1. A phase shifting plate comprising:
   a transparent base;
   a first thin transparent film formed with a uniform thickness upon said transparent base; and
   a second thin transparent film with a predetermined pattern formed upon said first thin transparent film;
   the thicknesses of said first and second thin transparent films being so determined that the intensity of light transmitted through said phase shifting plate may be uniformly distributed over the whole surface thereof, wherein the thicknesses of said first and second thin transparent films are so selected as to satisfy the following relationships:

$$d = \lambda/2 \ (n - 1), \text{ and}$$
   $$d_1 = \lambda/4n \ (m - n/n - 1) > 0$$

where
   $d_1, d$ = thicknesses of the first and second thin transparent films, respectively,
   $n$ = index of refraction of said films,
   $\lambda$ = wavelength of incident light, and
   $m$ = a positive integer.

2. A phase shifting plate as defined in claim 1, wherein said predetermined pattern of said second thin transparent film is irregular, so that the transmitted light rays have random phases.

3. A phase shifting plate as defined in claim 1, wherein both of said thin transparent films are made of ZnS and $m = 5$.

4. A phase shifting plate as defined in claim 1, wherein both of said thin transparent films are made of CeF, and $m = 7$.

5. A phase shifting plate as defined in claim 1, wherein said first and second thin transparent films are made of the same material and have the same index of refraction.

* * * * *